(12) United States Patent
Hayashi

(10) Patent No.: US 7,448,211 B2
(45) Date of Patent: Nov. 11, 2008

(54) RESERVOIR TANK FOR VEHICLE BRAKE SYSTEM

(75) Inventor: Mitsuharu Hayashi, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 567 days.

(21) Appl. No.: 11/167,226

(22) Filed: Jun. 28, 2005

(65) Prior Publication Data

US 2006/0017320 A1 Jan. 26, 2006

(30) Foreign Application Priority Data

Jul. 22, 2004 (JP) ............................. 2004-214622

(51) Int. Cl.
*B60T 11/26* (2006.01)
*B60T 17/22* (2006.01)

(52) U.S. Cl. .......................... 60/585; 60/534
(58) Field of Classification Search .................. 60/534, 60/585, 592; 137/574
See application file for complete search history.

(56) References Cited

U.S. PATENT DOCUMENTS

| | | | | |
|---|---|---|---|---|
| 2,113,060 A | * | 4/1938 | Sandberg | ..................... 29/463 |
| 4,304,038 A | * | 12/1981 | Yabu et al. | ..................... 29/463 |
| 4,488,404 A | * | 12/1984 | Arakawa et al. | ............... 60/585 |
| 4,514,980 A | * | 5/1985 | Ishiwata | ....................... 60/534 |
| 4,805,668 A | * | 2/1989 | Genter et al. | ................. 60/592 |
| 5,957,545 A | * | 9/1999 | Sawada et al. | ................ 60/585 |
| 6,105,611 A | | 8/2000 | Ando et al. | |

FOREIGN PATENT DOCUMENTS

JP 11-20660 1/1999

* cited by examiner

*Primary Examiner*—Michael Leslie
(74) *Attorney, Agent, or Firm*—Buchanan Ingersoll & Rooney PC

(57) ABSTRACT

A reservoir tank for a vehicle brake system has a tank body including upper and lower shells joined together along mating surfaces. A float and a fluid level sensor are mounted in a fluid level detecting chamber defined in the tank body. The float is fitted on a shaft of the fluid level sensor. A partition plate is fitted in the lower shell to restrict a flow of hydraulic fluid into and out of the fluid level detecting chamber. The partition plate is disposed near the top end of the shaft of the fluid level sensor to restrict the distance by which the float can move vertically. A filter, the fluid level sensor and the partition plate are all set in the lower shell. The filter and the partition plate having their top ends pressed against the bottom ends of partitioning walls of the upper shell. Thus, the filter and the partition wall are held in position in the tank body between the upper and lower shells.

5 Claims, 9 Drawing Sheets

RESERVOIR TANK FOR VEHICLE BRAKE SYSTEM

BACKGROUND OF THE INVENTION

The present invention relates to a reservoir tank mounted to a master cylinder or a hydraulic booster of a vehicle brake system.

A typical conventional reservoir tank is shown in FIG. 13B, which includes a tank body 1 comprising a lower shell 1a and an upper shell 1b, which are joined together by melting their mating surfaces with a hot plate H (FIG. 13A), putting the top shell 1b onto the lower shell 1a so that their molten mating surfaces contact each other, and allowing the mating surfaces to harden so as to be fixed to each other.

The reservoir tank includes partition walls 2 that divide the interior of the tank body 1 into a plurality of chambers, thereby minimizing pulsation of hydraulic fluid F, a filter 4 provided in one of the chambers through which hydraulic fluid F flows into and out of the reservoir tank, and a float 5 and a fluid level sensor 6 provided in a fluid level detecting chamber 3. The flow of hydraulic fluid F into and out of the fluid level detecting chamber 3 is restricted by a partition plate 7. The upper shell 1b has a hydraulic fluid supply port 8. (This particular type of reservoir tank is disclosed in JP patent publication 11-20660.)

The fluid level sensor 6 has a shaft 6a which carries at its top end a retainer 9 that restricts the movement of the float 5 and also prevents separation of the float 5 from the fluid level sensor 6. The retainer 9 is e.g. a snap ring fixed to the shaft of the sensor 6 by caulking or bonding.

Typically, different kinds of reservoir tanks are used in different types of motor vehicles manufactured not only by different car manufacturers but by a common car manufacturer. To reduce costs, it is desired that such different kinds of reservoirs be manufactured using as many common parts as possible.

An object of the present invention is therefore to provide a reservoir tank of which a greater number of parts can also be used for different kinds of reservoir tanks.

SUMMARY OF THE INVENTION

According to the present invention, there is provided a reservoir tank for use in a brake system comprising a tank body including upper and lower shells joined together along mating surfaces thereof, the tank body including partition walls which divide an interior of the tank body into a plurality of chambers including a fluid level detecting chamber, thereby preventing pulsation of hydraulic fluid in the tank body, a filter mounted in one of the plurality of chambers, a fluid level sensor mounted in the fluid level detecting chamber, the filter and the fluid level sensor being mounted in the lower shell, and a partition plate fitted in the lower shell and restricting a flow of hydraulic fluid into and out of the fluid level detecting chamber, the upper shell having a port through which hydraulic fluid can be supplied into the tank body, the filter and the partition plate having top ends thereof pressed against a bottom end of at least one of the partition walls, whereby the filter and the partition wall are held in position in the tank body between the upper and lower shells.

In designing reservoir tanks of which the amounts of hydraulic fluid used and the mounting angles differ from one anther, it is usually necessary only to change the positions of the partition walls. There is no need to use filters, fluid level sensors, or partition plates that are different in structure or shape. But the position of the hydraulic fluid supply port has to be changed according to surrounding parts and devices. Thus, it is necessary to prepare different upper shells of which the hydraulic fluid supply ports are provided at different positions.

According to the present invention, the filter, fluid level sensor, and partition plate are all fitted in the lower shell. Thus, it is not necessary to change the structure and shape of the filter, fluid level sensor and partition wall, as well as the lower shell, even if the position of the hydraulic fluid supply port of the upper shell is changed. That is, it is possible to prepare a plurality of reservoir tanks which differ from one another only in the structure and shape of the upper shells, and which can be mounted to different devices.

In a specific embodiment, the upper shell is selected from at least two upper shells each having a hydraulic fluid supply port that is different in shape and/or position from the hydraulic fluid supply port of the other of the at least two upper shells.

From another aspect of the invention, the upper shell comprises a main body and a port-forming member which is separate from the main body and in which the hydraulic fluid supply port is formed.

With this arrangement, it is only necessary to change the shape and position of the port-forming member and the shape and position of the mounting hole formed in the main body of the upper shell in which the port-forming member is mounted.

From still another aspect of the invention, there is provided a reservoir tank for use in a brake system comprising a tank body including upper and lower shells joined together along mating surfaces thereof, the tank body including partition walls which divide an interior of the tank body into a plurality of chambers including a fluid level detecting chamber, thereby preventing pulsation of hydraulic fluid in the tank body, a filter mounted in one of the plurality of chambers, a fluid level sensor mounted in the fluid level detecting chamber, and a partition plate for restricting a flow of hydraulic fluid into and out of the fluid level detecting chamber, the upper shell having a port through which hydraulic fluid can be supplied into the tank body, the upper shell comprising a main body and a port-forming member which is a separate member from the main body and in which is formed the hydraulic fluid supply port, the port-forming member being selected from at least two port-forming members that are different in shape from each other, and joined to the main body.

From yet another aspect of the invention, there is provided a reservoir tank for use in a brake system comprising a tank body including upper and lower shells joined together along mating surfaces thereof, the tank body including partition walls which divide an interior of the tank body into a plurality of chambers including a fluid level detecting chamber, thereby preventing pulsation of hydraulic fluid in the tank body, a filter mounted in one of the plurality of chambers, a fluid level sensor mounted in the fluid level detecting chamber, and a partition plate for restricting a flow of hydraulic fluid into and out of the fluid level detecting chamber, the upper shell having a port through which hydraulic fluid can be supplied into the tank body, the upper shell comprising a main body and a port-forming member formed with the hydraulic fluid supply port and including a leg, the port-forming member being a separate member from the main body and pressed against an inner wall of the main body through a seal with the leg in abutment with and pressed by the lower shell.

The above-mentioned various features of the present invention can be combined in any other way.

According to the present invention, because only the upper shell or the port-forming member of the upper shell can be replaced with a different one, it is not necessary to change the elements other than the upper shell or other than the port-forming member. This makes it possible to reduce the cost of the reservoir tank.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
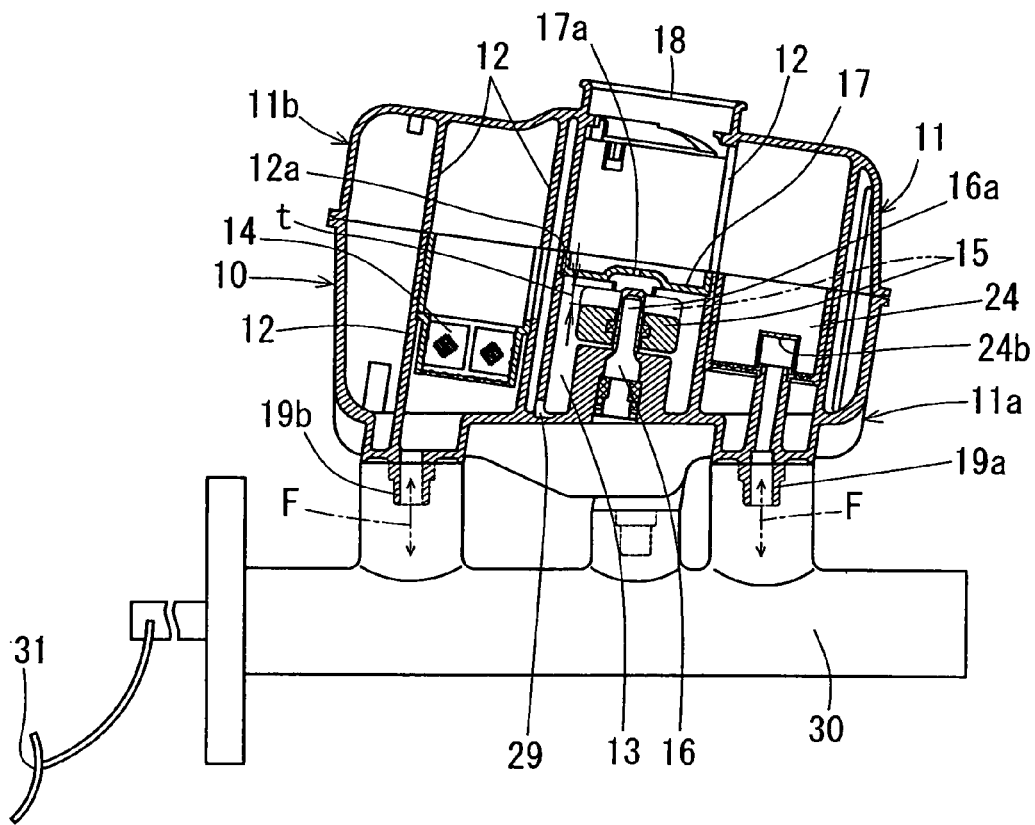
FIG. 1 is a partially cutaway front view of a first embodiment according to the present invention.
Figure 2:
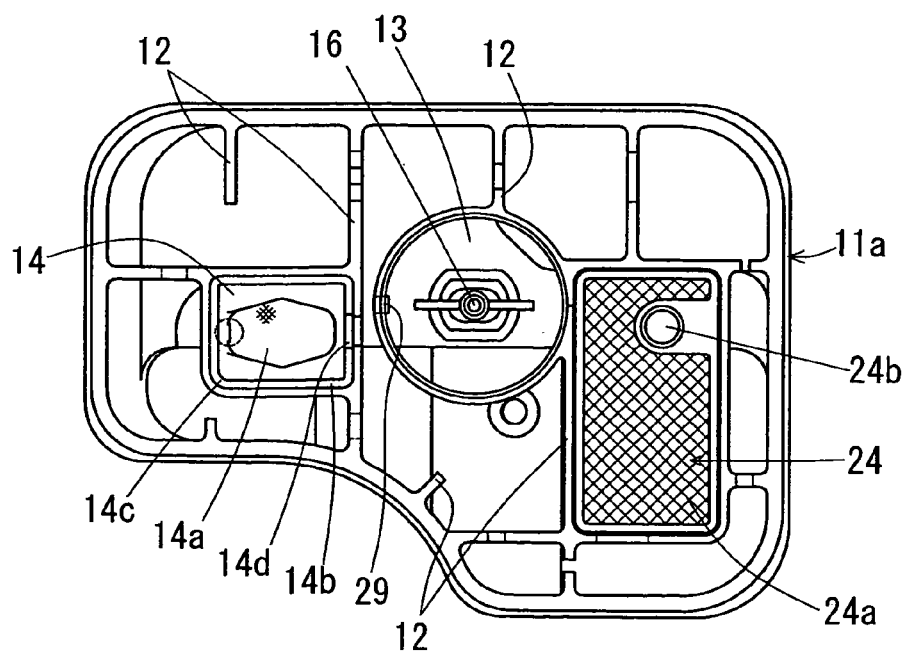
FIG. 2 is a plan view of the same with the upper shell omitted.
Figure 3:
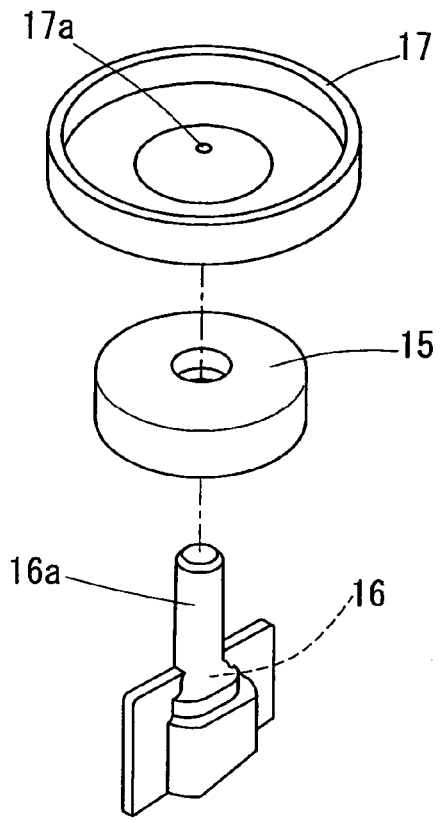
FIG. 3 is an exploded perspective view of the same, showing the fluid level sensor, float and partition plate.

Now referring to FIGS. 1-7, the reservoir tank 10 embodying the present invention is used in a vehicle brake system for controlling brake hydraulic pressure of the vehicle brakes. The reservoir tank 10 includes a tank body 11 comprising a lower shell 11a and an upper shell 11b, which are both formed of a synthetic resin, and mounted to a master cylinder 30. The interior of the tank body 11 is divided into a plurality of chambers including a fluid level detecting chamber 13 by partition walls 12 to minimize pulsation of hydraulic fluid F. (In the drawings, the partition walls 12 are partially not shown.)

The upper shell 11b has on its top a hydraulic fluid supply port 18 integral with the upper shell 11b through which hydraulic fluid F is supplied into the tank body 11. The lower shell 11a has a port 19a through which hydraulic fluid F flows between the master cylinder 30 and the reservoir tank 10, and a port 19b through which the hydraulic fluid F flows between the reservoir tank 10 and the master cylinder 30 and/or hydraulic units such as a pump. When hydraulic fluid flows into the reservoir tank through the port 19a or 19b, it passes through a filter 14 or 24 and any foreign objects such as small rubber pieces are removed.

A brake pedal 31 is coupled to the master cylinder 30. A cap, not shown, is put on the hydraulic fluid supply port 18. By removing the cap, hydraulic fluid F can be supplied into the tank body 11.

A fluid level sensor 16 is mounted in the hydraulic level detecting chamber 13 so as to be disposed in the lower shell 11a. The sensor 16 has a shaft 16a on which a float 15 is axially slidably mounted. According to the level of hydraulic fluid F in the tank body, the float 15 is movable by a distance t shown in FIG. 1 between the position shown by solid line in FIG. 1 and the position shown by phantom line. The fluid level sensor 16 (see FIG. 3) senses the axial position of the float and thus the fluid level. The fluid level sensor 16 may be a proximity switch.

A partition plate 17 is provided at the top opening of the fluid level detecting chamber 13. The partitioning plate is centrally formed with an aperture 17a through which hydraulic fluid F can flow in a restricted amount. With this arrangement, the fluid level in the fluid level detecting chamber 13 is less influenced by vibrations of the vehicle, so that the fluid level sensor 16 can detect the hydraulic fluid level in the reservoir tank 10 with high accuracy. The partition plate 17 is fixedly engaged in a cutout 12a formed in the inner surface of the partition wall 12 defining the fluid level detecting chamber 13.

Figure 4A:
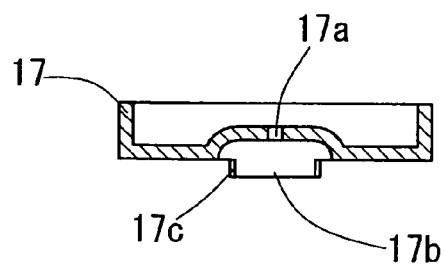
FIGS. 4A and 4B are a sectional front view and a bottom plan view of the partition plate of the first embodiment, respectively.
Figure 4B:
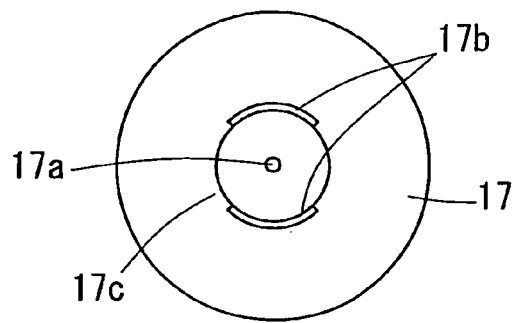

Part cylindrical protrusions 17b as shown in FIGS. 4A and 4B are provided on the bottom surface of the partition plate 17. The protrusions 17b have their centers of curvature disposed on the axis of the shaft 16a of the sensor 16 and thus on the axis of the float 15, and is arranged such that the float 15 abuts the bottoms of the part cylindrical protrusions 17b when the float 15 moves to the position shown by the phantom line in FIG. 1. The protrusions 17b thus prevent the float 15 from moving further upwardly from the position shown by phantom line in FIG. 1 and thus separating from the shaft 16a of the sensor 16. The protrusions 17b also serve to determine the distance t by which the float 15 is vertically movable relative to the shaft 16a. When the float 15 approaches the part cylindrical protrusions 17b, hydraulic fluid therebetween is smoothly discharged through the gaps 17c between the protrusions 17b. The gaps 17c are not limited in position and circumferential and vertical dimensions. But they are preferably sufficiently large so that hydraulic fluid can be smoothly discharged therethrough when the float 15 approaches the protrusions 17b irrespective of the attitude of the float (for example, even if the float is inclined).

Figure 5A:
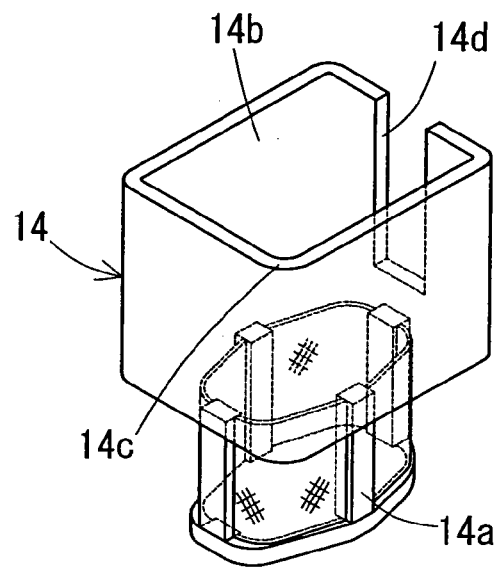
FIGS. 5A and 5B are a perspective view and a sectional front view of a filter of the first embodiment.
Figure 5B:
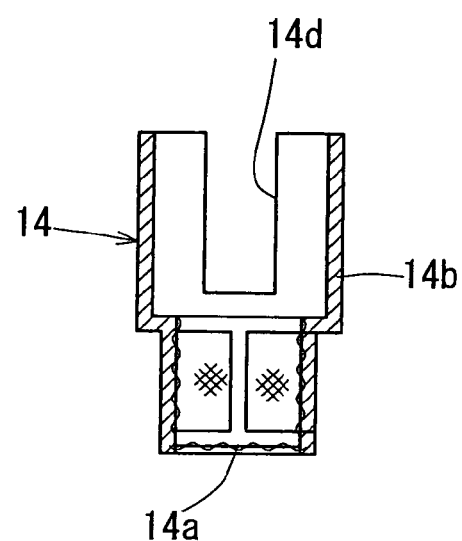

As shown in FIG. 5, the filter 14, which is received in the chamber having the port 19b, comprises a lower filter portion 14a and an upper hydraulic fluid reservoir portion 14b. The reservoir portion 14b comprises an open-topped box-shaped member having a rectangular section as viewed from top. As viewed from top, the box-shaped member has their corners rounded with one of the four corners, i.e. corner 14c, having a greater radius of curvature than the other three corners. A vertical slit 14d is formed in one of the four side walls of the box-shaped member that does not include the corner 14c. Through the slit 14d, hydraulic fluid flows into the reservoir portion 14b from the adjacent chamber. Since the corner 14c has a greater radius of curvature than the other three corners, the box-shaped member is asymmetrical as viewed from top. The box-shaped member may have its corners not rounded but chamfered.

The box-shaped reservoir portion 14b is fitted in a rectangular wall. Partition walls 12 extend from the three corners of the rectangular wall other than its corner corresponding to the corner 14c of the filter portion 14b. A slit is formed in the rectangular wall at its position corresponding to the slit 14d. Hydraulic fluid F thus flows into the reservoir portion 14b from the adjacent chamber through the slit formed in the rectangular wall and the slit 14d.

Figure 6:
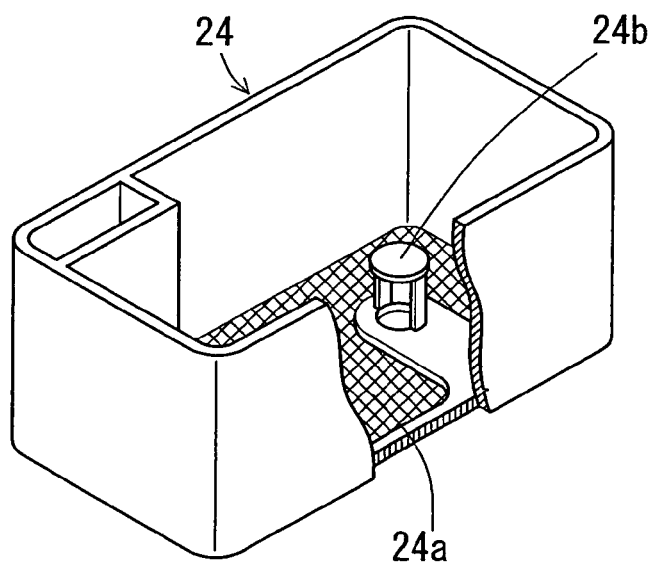
FIG. 6 is a partially cutaway perspective view of another filter of the first embodiment.

As shown in FIG. 6, the filter 24, which is received in the chamber having a port 19a, is an open-topped box member of which the bottom is a filter 24a. As shown in FIG. 1, a tubular protrusion extends from the port 19a and has its top end fitted in the bottom of the filter 24. Right over the top opening of the tubular protrusion, a deflector plate 24b is provided. The deflector plate 24 deflects hydraulic fluid discharged from the tubular protrusion toward the hydraulic supply port 18, thereby preventing any hydraulic fluid discharged from the tubular protrusion from reaching the hydraulic fluid supply port 18. With this arrangement, even if hydraulic fluid returns violently into the reservoir tank 10 with the hydraulic fluid supply port 18 open in order to replace parts or to expel air, hydraulic fluid will never splash out through the port 18.

Figure 7A:
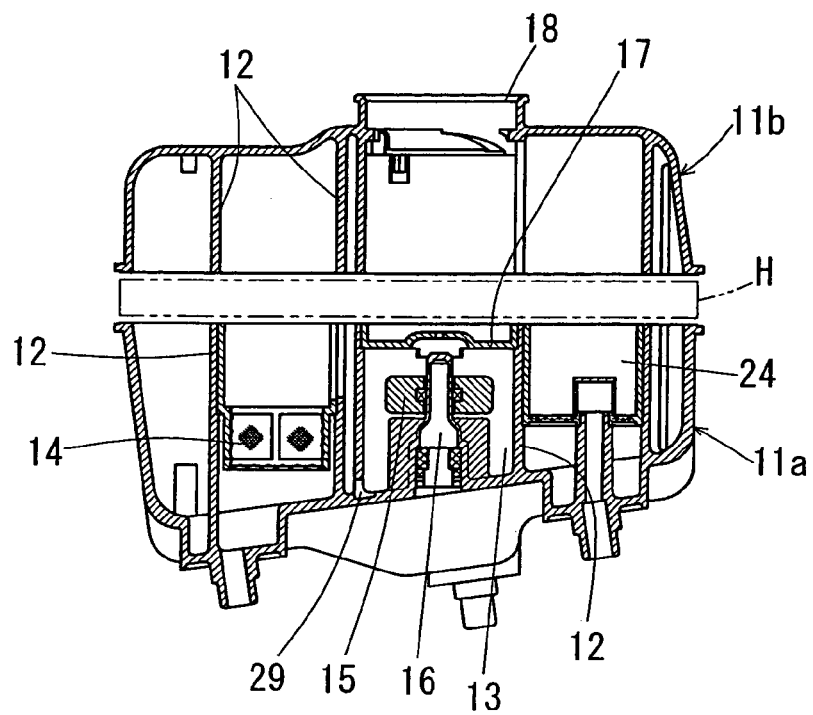
FIGS. 7A and 7B are sectional front views of the reservoir tank of the first embodiment, before and after assembly, respectively.
Figure 7B:
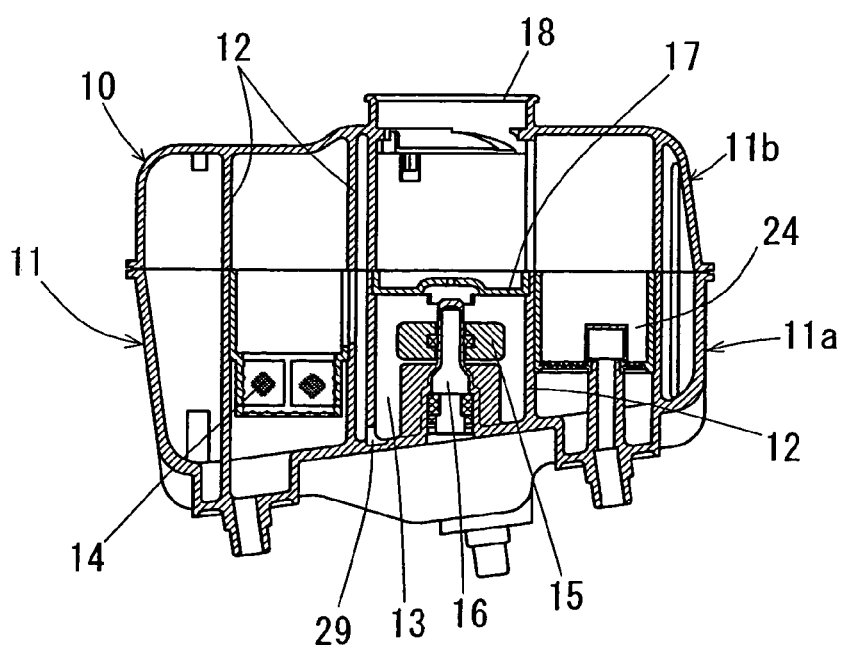

In order to assemble the reservoir tank 10, the filters 14, 24, the fluid level sensor 16 and the float 15 are set in the lower shell 11a, and the partition plate 17 is fitted in the lower shell 11a. Then, as shown in FIG. 7A, a hot plate H is inserted between the upper and lower shells 11b and 11a to melt their mating surfaces. The molten mating surfaces are brought into abutment with each other and hardened to join the upper and lower shells 11b and 11a together. With the upper and lower shells joined together, the partition plate 17, which is fitted in the lower shell 11a, is disposed right over the top end of the shaft 16a of the fluid level sensor 16, thereby preventing the float 15 from coming off the shaft 16a.

When the mating surfaces of the upper and lower shells are melted by the hot plate H, the top ends of the filter 14 and the partition plate 17 are also melted by the hot plate. Thus, when the mating surfaces of the upper and lower shells are joined together, the top ends of the filter 14 and the partition plate 17 are also pressed against the bottom ends of partition walls 12 and joined thereto. Instead of melting and joining the upper and lower shells, the upper and lower shells may be joined together using an adhesive or by any other known means.

Figure 8:
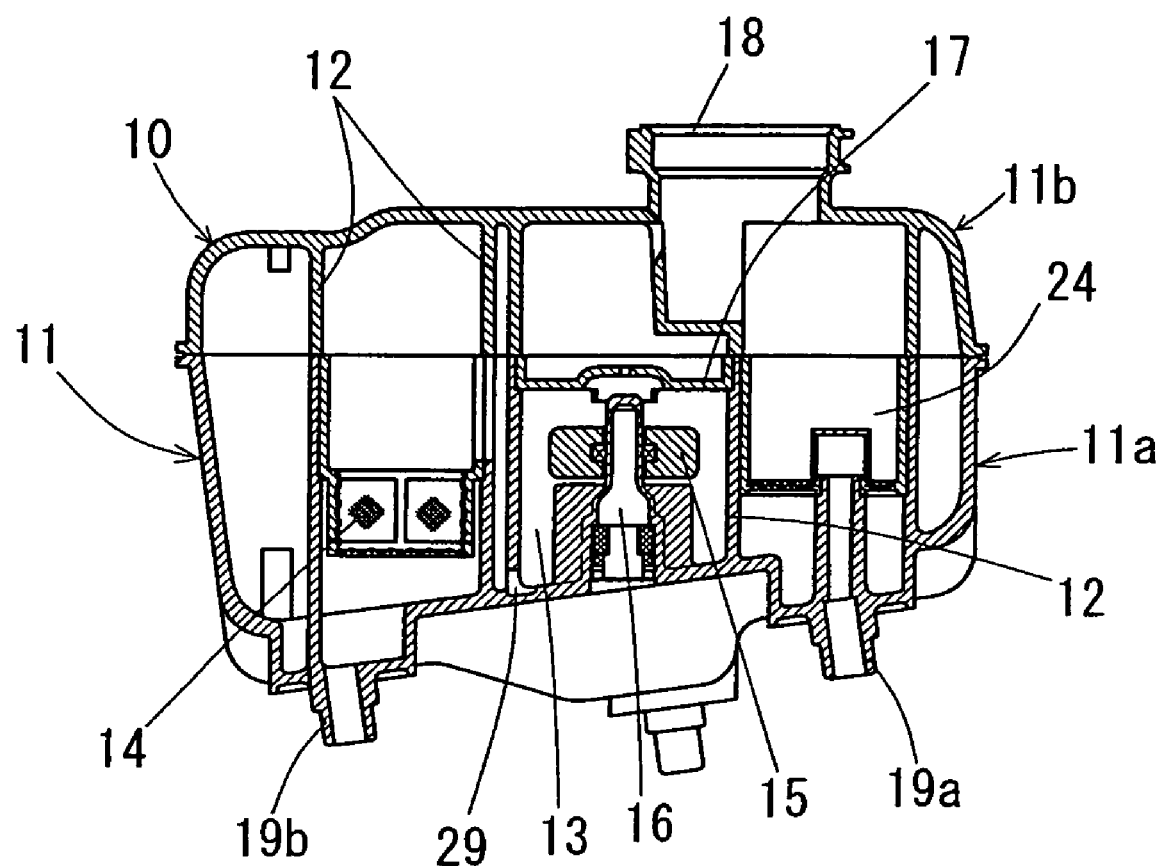
FIG. 8 is a partially cutaway front view of a second embodiment.

The reservoir tank 10 can be usually used for different types of devices simply by changing only the upper shell 11b to a new one. For example, it may be necessary to prepare a new upper shell 11b having a hydraulic fluid supply port 18 that is different in shape and/or position. Ordinarily, there is no need to change the lower shell 11a and other parts of the reservoir tank 10. A new upper shell 11b can be formed using a new mold. Such a new upper shell 11b can be fused to the lower shell 11a to obtain a new reservoir tank 10. FIG. 8 shows such a new upper shell 11b having a hydraulic fluid supply port 18 that is provided at a different position from the position of the port 18 shown e.g. in FIG. 1.

Like the reservoir portion 14b of the filter 14, the filter 24 is also a box-shaped member having a rectangular section as viewed from top with the four corners rounded such that one of the four corners has a greater radius of curvature than the other three corners. Thus, as viewed from top, the filter 24 is asymmetrical. With this arrangement, the filter 24 will never be inserted in a wrong position.

FIGS. 9 to 12 show other embodiments, in which the hydraulic fluid supply port 18 is formed in a member separate from the upper shell. The embodiments of FIGS. 9 to 12 differ from one another only in the shape of the member forming the port 18 (which is hereinafter referred to as the port-forming member 18). The upper shells 11b of these embodiments are all identical in structure, particularly in the shape and position of the mounting holes in which the port-forming members 18 are mounted.

Figure 9A:
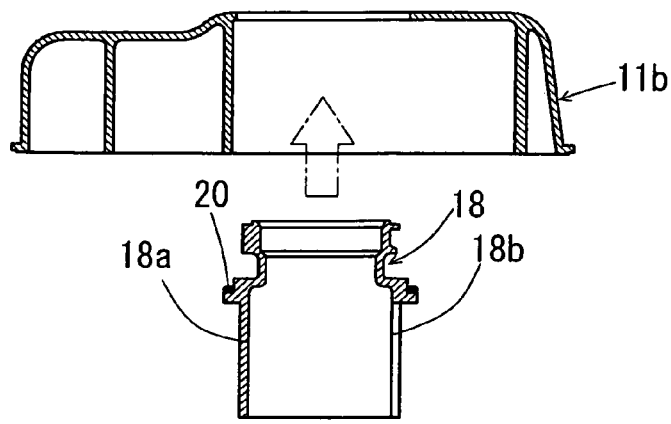
FIGS. 9A and 9B are sectional views of the upper shell of a third embodiment, before and after assembly, respectively.
Figure 9B:
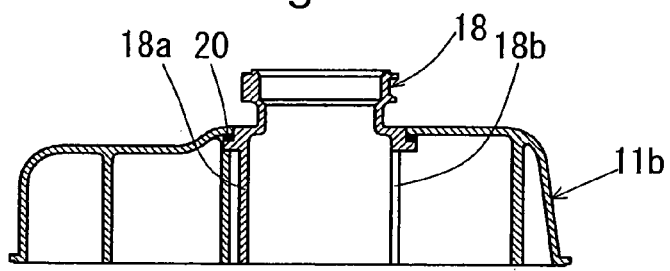
Figure 9C:
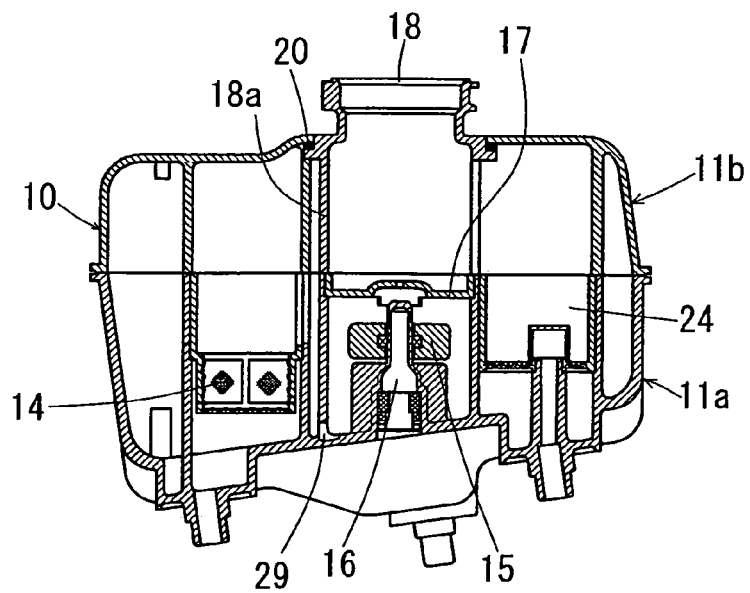
FIG. 9C is a sectional view of the third embodiment.
Figure 10A:
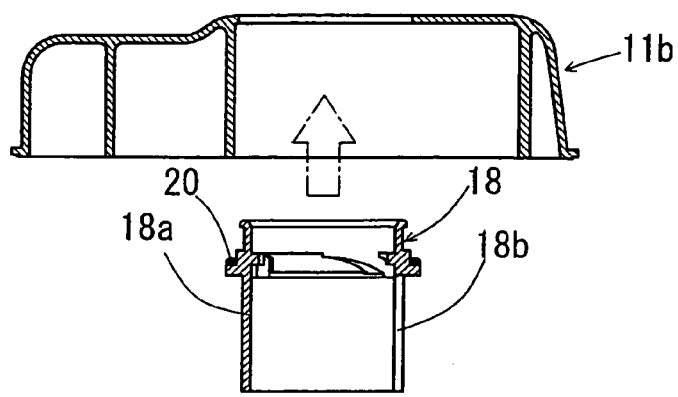
FIGS. 10A and 10B are sectional views of the upper shell of a fourth embodiment, before and after assembly, respectively.
Figure 10B:
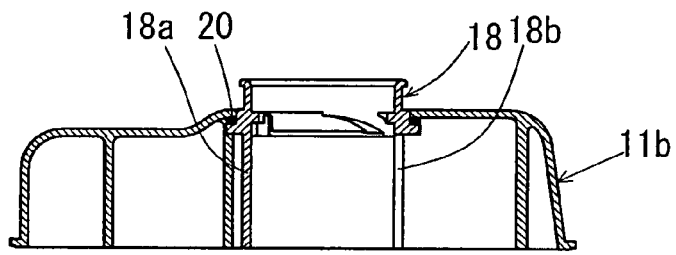
Figure 10C:
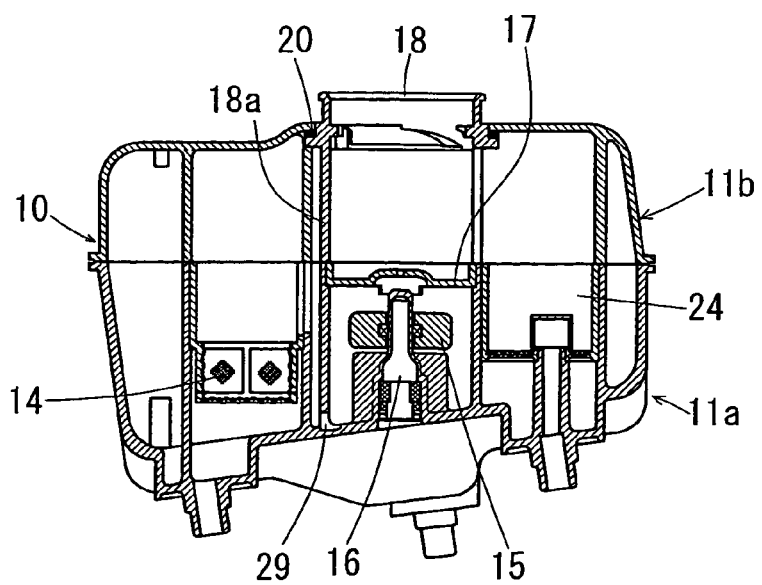
FIG. 10C is a sectional view of the fourth embodiment.

The port-forming members 18 of the embodiments of FIGS. 9 and 10 each include, as shown in FIGS. 9A and 10A, a cylindrical leg 18a formed with at least one slit 18b through which hydraulic fluid can pass. To mount the port-forming members 18, they are inserted into the mounting holes of the respective upper shells 11b from below until their shoulder portions abut the edges of the mounting holes through seals 20 as shown in FIGS. 9B and 10B. In this state, the upper shell 11b of each embodiment is placed on top of and fused to the lower shell 11a as shown in FIGS. 9C and 10C.

With the upper and lower shells 11b and 11a joined together, the leg 18a abuts the top end of one of the partition walls 12, and thus is pressed against the inner wall of the upper shell 11b through the seal 20. The number and shape of the leg or legs 18a are not limited. For example, instead of the single cylindrical leg 18a, a plurality of circumferentially spaced apart legs may be used.

Figure 11A:
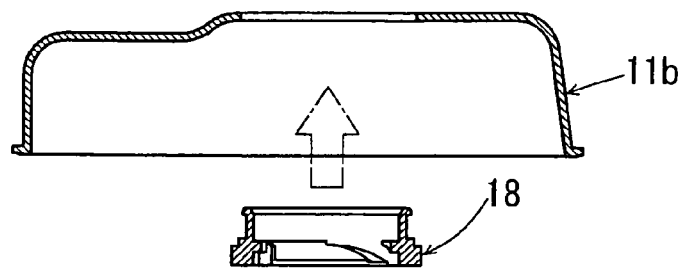
FIGS. 11A and 11B are sectional views of the upper shell of a fifth embodiment, before and after assembly, respectively.
Figure 11B:
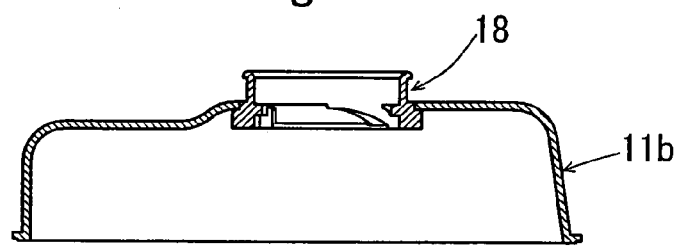
Figure 12A:
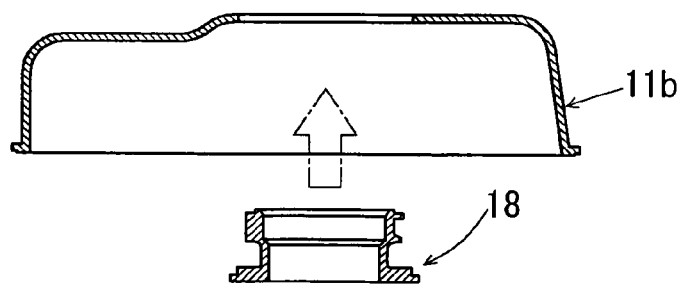
FIGS. 12A and 12B are sectional views of the upper shell of a sixth embodiment, before and after assembly, respectively.
Figure 12B:
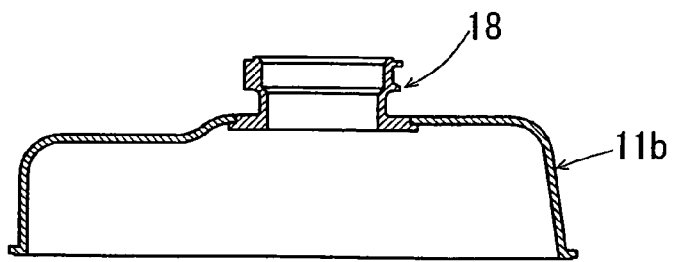
Figure 13A:
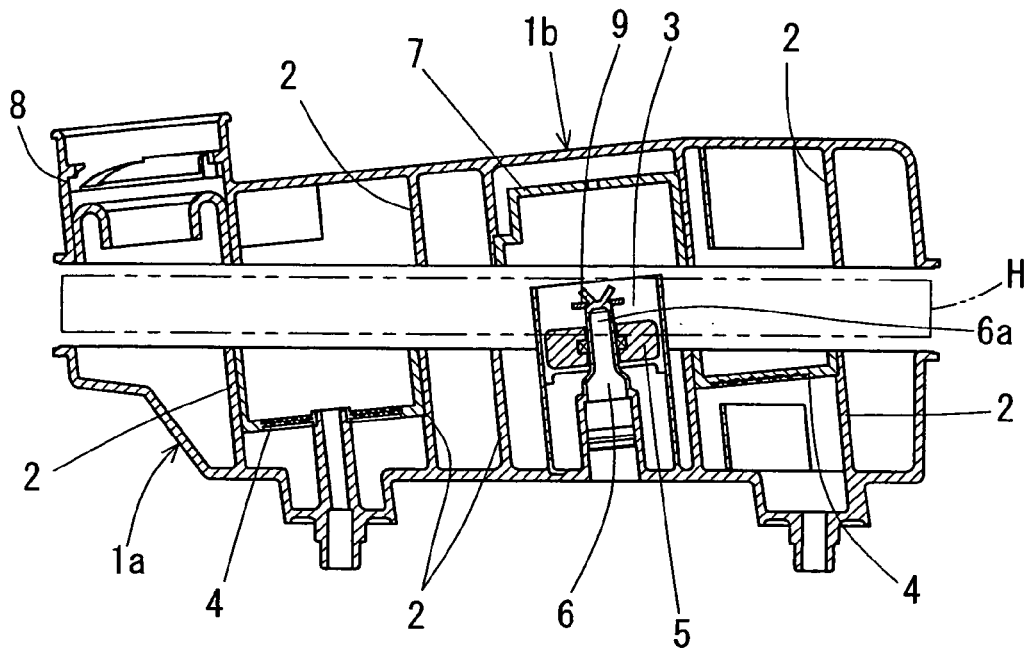
FIGS. 13A and 13B are sectional views of a conventional reservoir tank, before and after assembly, respectively.
Figure 13B:
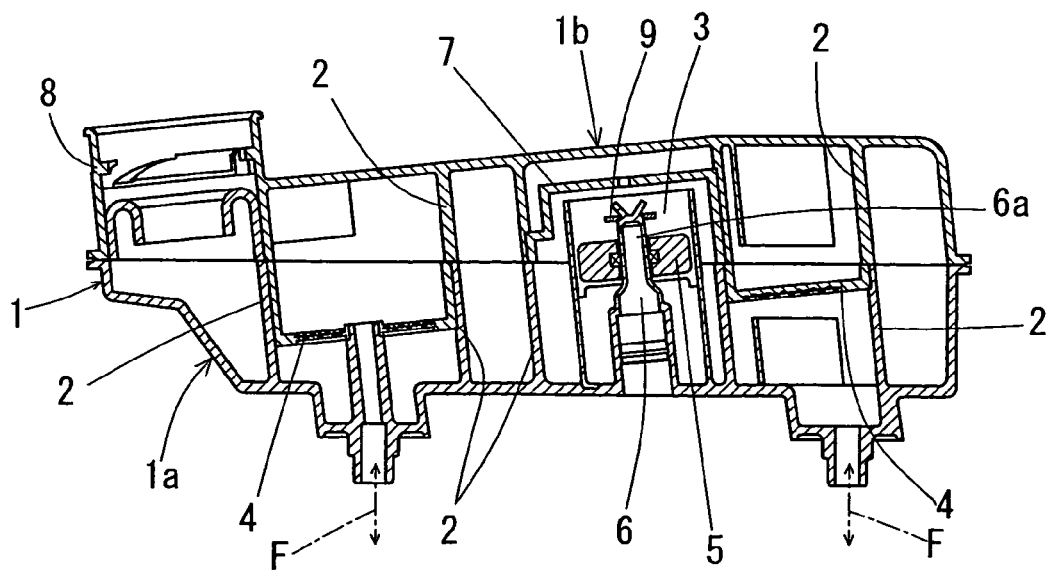

As shown in FIGS. 11A and 12A, the port-forming members 18 of FIGS. 11 and 12 are separate members from the upper shell and different in shape from each other. They are fitted in the respective upper shells 11b and joined thereto by fusing or using an adhesive as shown in FIGS. 11B and 12B. In this state, the upper shell 11b of each embodiment is placed on top of and fused to the lower shell 11a. Instead of fitting the port-forming members 18 into the mounting holes from below as shown by the arrows of FIGS. 11A and 12A, they may be fitted into the mounting holes from above.

In the embodiments of FIGS. 9 to 12, simply by changing the port-forming member 18 with a new one, the reservoir tank 10 can be used for different types of devices without the need to change the other parts of the reservoir tank such as the upper and lower shells to new ones.

In the embodiment, the reservoir tank is mounted on the master cylinder 30. But the concept of the present invention is applicable to reservoir tanks of any other devices. The fluid level sensor 16 may be of the type that includes no float 15.

What is claimed is:

1. A reservoir tank for use in a brake system comprising:
    a tank body including upper and lower shells joined together along mating surfaces thereof;
    said tank body including partition walls which divide an interior of said tank body into a plurality of chambers including a fluid level detecting chamber, thereby preventing pulsation of hydraulic fluid in said tank body;
    a filter mounted in one of said plurality of chambers;
    a fluid level sensor mounted in said fluid level detecting chamber;
    said filter and said fluid level sensor being mounted in said lower shell; and
    a partition plate fitted in said lower shell and restricting a flow of hydraulic fluid into and out of said fluid level detecting chamber;
    said upper shell having a hydraulic fluid supply port through which hydraulic fluid can be supplied into said tank body;
    said filter and said partition plate having top ends thereof pressed against a bottom end of at least one of said partition walls, whereby said filter and said partition plate are held in position in said tank body between said upper and lower shells.

2. The reservoir tank of claim 1 wherein said upper shell is selected from at least two upper shells each having a hydraulic fluid supply port that is different in shape and/or position from the hydraulic fluid supply port of the other of said at least two upper shells.

3. The reservoir tank of claim 1 wherein said upper shell comprises a main body and a port-forming member which is a separate member from said main body and in which is formed said hydraulic fluid supply port, said port-forming member being selected from at least two port-forming members that are different in shape from each other, and joined to said main body.

4. The reservoir tank of claim 1 wherein said upper shell comprises a main body and a port-forming member formed with said hydraulic fluid supply port and including a leg, said port-forming member being a separate member from said main body and pressed against an inner wall of said main body through a seal with said leg in abutment with and pressed by a partition wall of said lower shell.

5. A reservoir tank for use in a brake system comprising:
a tank body including upper and lower shells joined together along mating surfaces thereof,
said tank body including partition walls which divide an interior of said tank body into a plurality of chambers including a fluid level detecting chamber, thereby preventing pulsation of hydraulic fluid in said tank body;
a filter mounted in one of said plurality of chambers;
a fluid level sensor mounted in said fluid level detecting chamber; and
a partition plate for restricting a flow of hydraulic fluid into and out of said fluid level detecting chamber;
said upper shell having a port through which hydraulic fluid can be supplied into said tank body;
said upper shell comprising a main body and a port-forming member formed with said hydraulic fluid supply port and including a leg, said port-forming member being a separate member from said main body and pressed against an inner wall of said main body through a seal with said leg in abutment with and pressed by a partition wall of said lower shell.

* * * * *